No. 761,151. PATENTED MAY 31, 1904.
W. A. CUMMINGS.
MACHINE FOR ATTACHING, TIGHTENING, AND CLAMPING
WIRE HOSE BANDS.
APPLICATION FILED MAY 18, 1903.
NO MODEL.
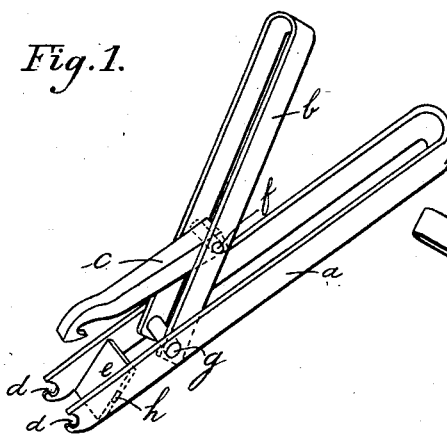
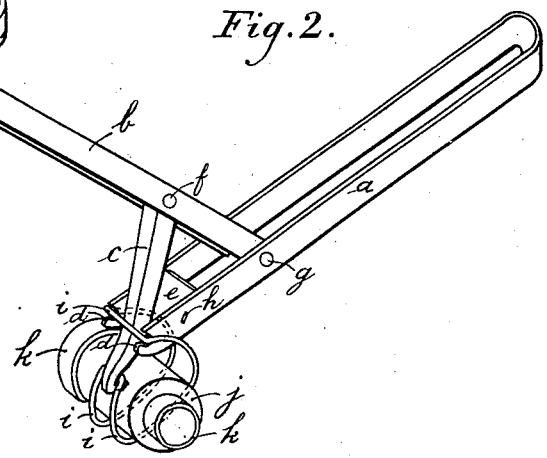
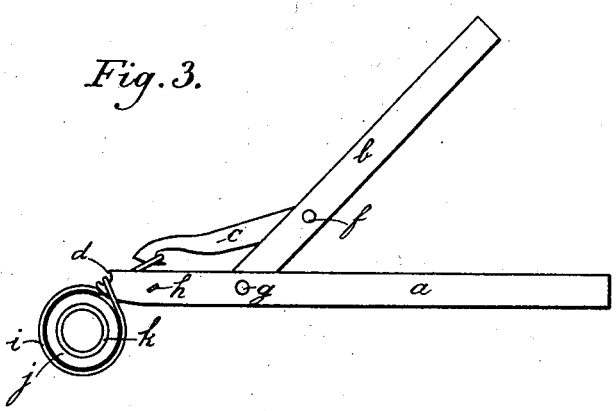
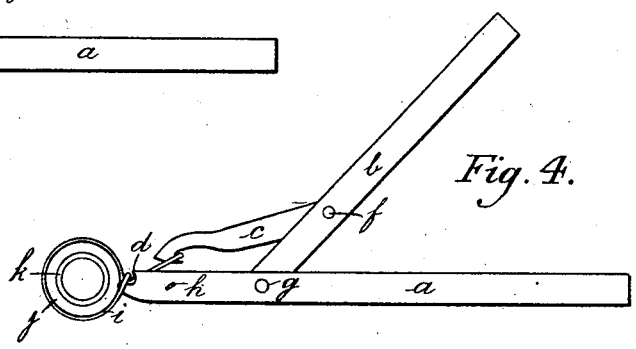
WITNESSES:
S. P. Domer
Chas P Lund
William A Cummings
INVENTOR.

No. 761,151. Patented May 31, 1904.

UNITED STATES PATENT OFFICE.

WILLIAM A. CUMMINGS, OF SPOKANE, WASHINGTON.

MACHINE FOR ATTACHING, TIGHTENING, AND CLAMPING WIRE HOSE-BANDS.

SPECIFICATION forming part of Letters Patent No. 761,151, dated May 31, 1904.

Application filed May 18, 1903. Serial No. 157,571. (No model.)

*To all whom it may concern:*

Be it known that I, WILLIAM A. CUMMINGS, a citizen of the United States, residing in the city of Spokane, county of Spokane, State of Washington, have invented a new and useful Machine for Attaching, Tightening, and Clamping Wire Hose-Bands Used in Attaching Hose of All Kinds to Couplings; and I hereby declare the following to be a full, clear, and exact description of the invention, such as will serve others skilled in the art to which it pertains to make and use the same.

This invention has for its object the attachment of oblong endless wire hose-bands to that part of a hose containing a coupling in such a manner as to clamp the hose to the coupling and to afford a means of tightening and clenching the same in position and so compressing the hose between the wire band and the coupling as to obviate all slipping, leaking, or separation of the hose from the coupling. I attain this object by the mechanism illustrated in the accompanying drawings, in which—

Figure 1 is a perspective sketch of the entire device, showing each part in detail. Fig. 2 is a perspective sketch showing the device engaging the wire band encircling a section of the hose containing a coupling with the wire band relaxed and ready for tightening. Fig. 3 is a side elevation of the device, showing the lever $b$ drawn back in such manner as to tighten the wire band around the hose, compressing the hose between the wire band and the metal coupling. Fig. 4 is a side elevation of the device, the same as Fig. 3, but with the hose forced upward around the open end of the frame $a$, thereby causing a bend in the wire band and clamping the same in position, preventing it from slipping.

Similar letters refer to similar parts throughout the several views. All parts of the device are made of metal.

$a$ is an elongated U-shaped frame, the ends of which are formed into hooks $d\ d$.

$b$ is a lever similar in shape to $a$, though shorter, pivoted within the frame $a$ by the pin or pivot $g$.

The hook $c$ is pivoted within the lever $b$ by the pin $f$.

$d\ d$ are the hooks formed in the ends of the frame $a$.

$e$ is a guide-block set at an angle of about forty-five degrees between the ends of the frame $a$ between the hooks in frame $a$ and the pivot $g$ and uniting the two sides of frame. The purpose of this block $e$ is to guide the hook $c$ and hold the same forward in position in the frame $a$; $f$, pivot in the lever $b$, on which the hook $c$ swings up and down; $g$, pin or pivot in the frame $a$, on which the lever $b$ swings back and forth; $h$, rivet holding the block $e$ in place in the frame $a$; $i\ i\ i$, the wire hose-band; $j$, section of the hose containing coupling $k\ k$.

The mode of operating this machine is as follows: The lever $b$ is swung forward on the pivot $g$ toward the open end of the frame $a$ until the hook $c$ drops between the ends of the frame $a$ and beneath the hooks $d\ d$. One loop of the endless wire band is then placed in the hooks $d\ d$, the end of the hose containing the coupling is placed on the wire band, and the other end of said wire band is bent around the hose and the other loop of the wire band engaged by the hook $c$. (See Fig. 2.) By drawing back on the lever $b$ the lower loop of the wire band $i\ i$, attached to the hook $c$, is drawn upward through the upper loop of the same wire band, held firmly in place by the hooks $d\ d$, and the wire band $i\ i\ i$ is thus tightened, compressing the hose $j$ between the wire band $i$ and the coupling $k$. (See Fig. 3.) By holding the lever $b$ firmly in its position and forcing the hose $j$, with the wire band $i$ surrounding the same, upward with the hand a bend is effected in the wire band $i$ at the point where it is crossed by the end of the same band resting in the hooks $d\ d$, thus clenching the same in place and preventing the wire band $i$ from losing its tension. (See Fig. 4.) The loose end of the wire band is then hammered back on the hose to make the fastening permanent.

This device may be used with either wood or metal couplings. It may also be used to attach metal bands to pipes for the purpose of strengthening the same. By the use of this device wire bands are permanently affixed to the hose and clamp the hose to the coupling in such manner as to obviate any leaking or separation of the hose from the coupling.

I claim as my invention and desire to secure Letters Patent for—

1. In an implement for attaching wire bands to hose, an elongated U-shaped frame the ends of which are notched to receive one end of a wire band, a lever pivoted therein, an arm terminating in a hook pivoted on said lever.

2. In an implement for attaching wire bands to hose, an elongated U-shaped frame, the ends of which are notched, a similar-shaped lever pivoted therein, an arm terminating in a hook pivoted on said lever.

3. In an implement for attaching wire bands to hose, a stationary U-shaped frame, the ends of which contain notches to receive one end of a wire hose-band, a movable lever pivoted in said frame, an arm terminating in a hook pivoted on said lever.

In witness whereof I have hereunto affixed my signature, in the presence of two witnesses, this 12th day of May, 1903.

WILLIAM A. CUMMINGS.

Witnesses:
S. P. DOMER,
CHAS. P. LUND.